United States Patent
Shan

(10) Patent No.: US 10,795,014 B2
(45) Date of Patent: Oct. 6, 2020

(54) METHOD OF ADAPTATIVE-ARRAY BEAMFORMING WITH A MULTI-INPUT MULTI-OUTPUT (MIMO) AUTOMOBILE RADAR

(71) Applicant: Tiejun Shan, Plano, TX (US)

(72) Inventor: Tiejun Shan, Plano, TX (US)

(73) Assignee: THE EUCLIDE 2012 INVESTMENT TRUST, Plano, TX (US)

( * ) Notice: Subject to any disclaimer, the term of this patent is extended or adjusted under 35 U.S.C. 154(b) by 115 days.

(21) Appl. No.: 16/248,761

(22) Filed: Jan. 15, 2019

(65) Prior Publication Data

US 2019/0219685 A1 Jul. 18, 2019

Related U.S. Application Data

(63) Continuation-in-part of application No. 16/242,958, filed on Jan. 8, 2019.

(60) Provisional application No. 62/617,962, filed on Jan. 16, 2018, provisional application No. 62/616,844, filed on Jan. 12, 2018, provisional application No. 62/617,723, filed on Jan. 16, 2018, provisional application No. 62/618,735, filed on Jan. 18, 2018, provisional application No. 62/619,204, filed on Jan. 19, 2018, provisional application No. 62/628,436, filed on Feb. 9, 2018, provisional application No. 62/630,416, filed on Feb. 14, 2018, provisional application No. 62/754,448, filed on Nov. 1, 2018, (Continued)

(51) Int. Cl.
*G01S 13/72* (2006.01)
*G01S 13/89* (2006.01)
*G01S 13/931* (2020.01)
*G01S 13/87* (2006.01)
*G01S 13/42* (2006.01)

(52) U.S. Cl.
CPC ............ *G01S 13/726* (2013.01); *G01S 13/42* (2013.01); *G01S 13/878* (2013.01); *G01S 13/89* (2013.01); *G01S 13/931* (2013.01)

(58) Field of Classification Search
CPC ...... G01S 13/726; G01S 13/878; G01S 13/42; G01S 13/89; G01S 13/931; G01S 13/48; G01S 13/685; G01S 13/426
USPC ............................... 342/107, 21, 82, 32, 124
See application file for complete search history.

(56) References Cited

U.S. PATENT DOCUMENTS 9,791,564 B1 * 2/2017 Harris et al. ............ G01S 13/93
9,575,160 B1 * 10/2017 Davis et al. ............ G01S 13/93
(Continued)

*Primary Examiner* — Bo Fan

(57) ABSTRACT

A method of adaptative-array beamforming with a multi-input multi-output (MIMO) automobile radar includes a MIMO radar for transmitting a plurality of initial scanning beams in a radial direction. The plurality of initial scanning beams is transmitted one by one at each direction. Accordingly, the MIMO radar receives a reflected scanning beam, wherein each reflected scanning beam is associated with a corresponding initial scanning beam. The reflected scanning beam is used to detect at least one low-resolution target. Subsequently, the MIMO radar transmits a plurality of initial tracking beams, wherein each initial tracking beams is directed towards a low-resolution target. This results in generation of a corresponding reflected tracking beam for each of the plurality of initial tracking beams. Finally, the MIMO radar detects at least one high-resolution target within each reflected tracking beam.

7 Claims, 14 Drawing Sheets

Related U.S. Application Data provisional application No. 62/756,318, filed on Nov. 6, 2018.

(56) References Cited

U.S. PATENT DOCUMENTS

| | | | |
|---|---|---|---|
| 2015/0168546 A1* | 6/2015 | Nakagawa | G01S 7/282 |
| | | | 342/21 |
| 2016/0282450 A1* | 9/2016 | Kishigami | G01S 7/285 |
| 2016/0285172 A1* | 9/2016 | Kishigami | H01Q 21/08 |
| 2017/0212213 A1* | 7/2017 | Kishigami | G01S 13/04 |
| 2017/0310758 A1* | 10/2017 | Davis et al. | H04L 29/08 |

* cited by examiner

METHOD OF ADAPTATIVE-ARRAY BEAMFORMING WITH A MULTI-INPUT MULTI-OUTPUT (MIMO) AUTOMOBILE RADAR

The current application claims a priority to the U.S. Provisional Patent application Ser. No. 62/617,962 filed on Jan. 16, 2018.

The current application also claims a priority to a U.S. non-provisional application Ser. No. 16/242,958 filed on Jan. 8, 2019. The U.S. non-provisional application Ser. No. 16/242,958 claims a priority to a U.S. provisional application Ser. No. 62/616,844 filed on Jan. 12, 2018.

The current application also claims a priority to the U.S. Provisional Patent application Ser. No. 62/617,723 filed on Jan. 16, 2018.

The current application also claims a priority to the U.S. Provisional Patent application Ser. No. 62/618,735 filed on Jan. 18, 2018.

The current application also claims a priority to the U.S. Provisional Patent application Ser. No. 62/619,204 filed on Jan. 19, 2018.

The current application also claims a priority to the U.S. Provisional Patent application Ser. No. 62/628,436 filed on Feb. 9, 2018.

The current application also claims a priority to the U.S. Provisional Patent application Ser. No. 62/630,416 filed on Feb. 14, 2018.

The current application also claims a priority to the U.S. Provisional Patent application Ser. No. 62/754,448 filed on Nov. 1, 2018.

The current application also claims a priority to the U.S. Provisional Patent application Ser. No. 62/756,318 filed on Nov. 6, 2018.

FIELD OF THE INVENTION

The present invention generally relates to a method of implementing a multi-input multi-output (MIMO) adaptive antenna array for automobile radar sensing with target positioning functions. More specifically, the MIMO adaptive antenna array optimizes a plurality of scanning beams and a plurality of tracking beams to track a plurality of targets.

BACKGROUND OF THE INVENTION

Vehicle wireless communication networks and auto radar for automatic driving vehicle have been fast-growing areas of interest for many automobile and wireless enterprises. These markets are among fastest growing markets in the world.

Recently, the development of automobile radar as a sensing tool for advanced driver assistance systems (ADAS) and autonomous driving is the focus of automobile manufactures and the artificial intelligence (AI) research and development industry.

Vehicle communication networks such as Vehicle-to-Everything (V2X) are a driving force behind the 5G mobile standard, product developments, and applications. A V2X network connects vehicles with the surrounding communication nodes such as ground points, pedestrians, mobile or static base stations, and/or traffic infrastructure such as police stations, toll booth, traffic lights, etc.

The present invention is a method of implementing an adaptive multi-input multi-output (MIMO) radar for automotive applications. The MIMO radar has the ability to track multiple targets simultaneously. To achieve this, the MIMO adaptive antenna array uses beamforming to form multiple sub-beams to scan multiple targets, simultaneously. Preferably, fast electronic beam scanning is used to reduce the number of beams requires to cover 360-degree range. The beam forming can form variable beam patterns to adapt for the target-range, speed, and class. This increases radar detectability and cost reduction of hardware implementation. Finally, high resolution adaptive antenna array receiver and high-resolution direction-of-arrive (DoA) algorithm such as MUSIC allows for radar imaging capabilities.

In the preferred embodiment of the present invention, the MIMO radar comprises a plurality of antenna arrays, each of which can transmit a scanning beam to scan a target and a tracking beam to track the target. Further, the MIMO radar adapts the signal characteristics of the scanning beam and the tracking beam for the specific characteristics of the target. By adaptively adjusting the plurality of antenna arrays, the MIMO radar can scan in a 360-degree range, vary the time division at each scanning direction, and change the beam width and shape for each direction according to system resolution requirements.

In one embodiment, variable time vision at each scanning direction allows for non-uniform scanning. As such, fast scan for the direction there is no target found, giving more time for scanning the direction where targets have been found.

In another embodiment, the beam width and shape of both the scanning beam and the tracking beam is adjusted based on the distance between the target and the MIMO radar.

DETAILED DESCRIPTION OF THE INVENTION

All illustrations of the drawings are for the purpose of describing selected versions of the present invention and are not intended to limit the scope of the present invention.

The present invention is a method of adapting the antenna array of a multi-input multi-output (MIMO) radar for multi-target scanning and tracking. The MIMO radar of the present invention adapts the signal characteristics of the scanning and tracking beams to suit the specific characteristics of the objects being tracked.

Figure 1:
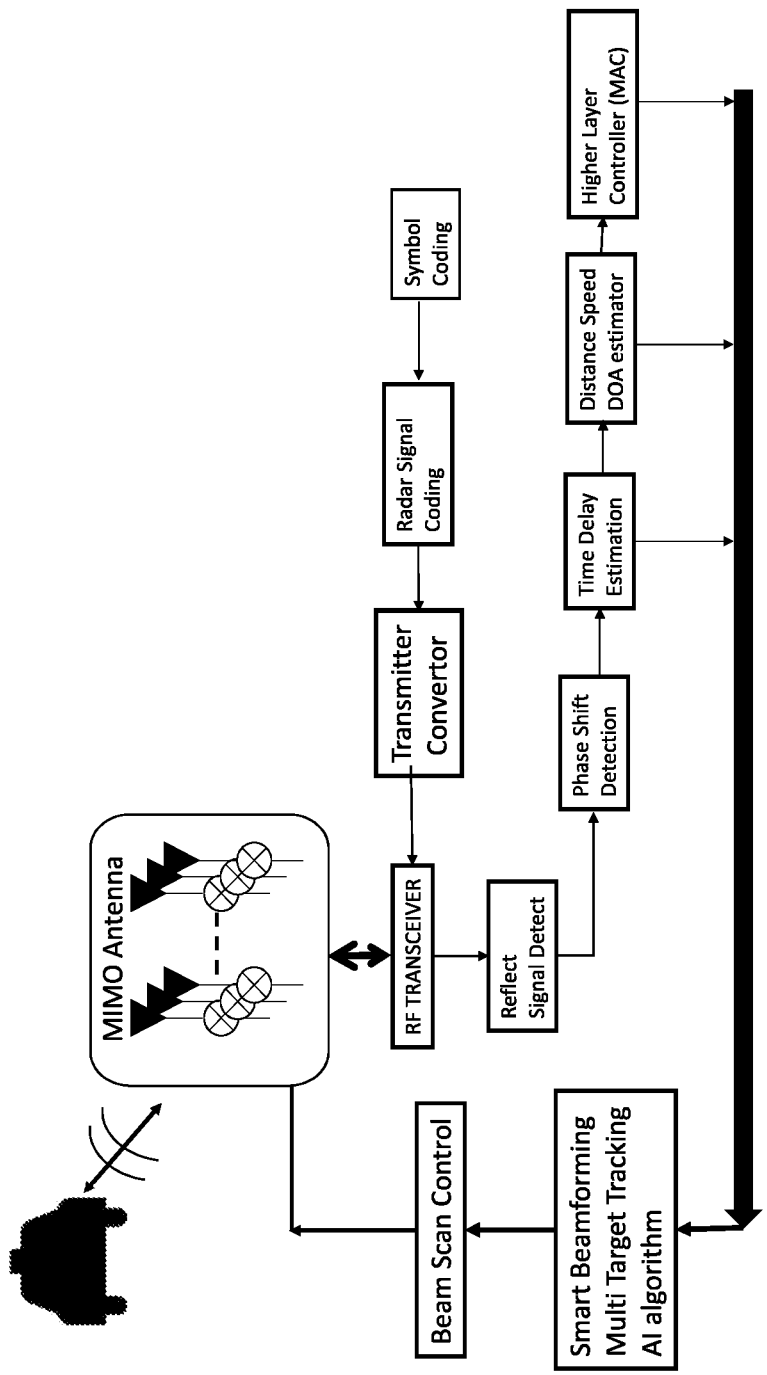
FIG. 1 is a schematic diagram of the system of the present invention.
Figure 2:
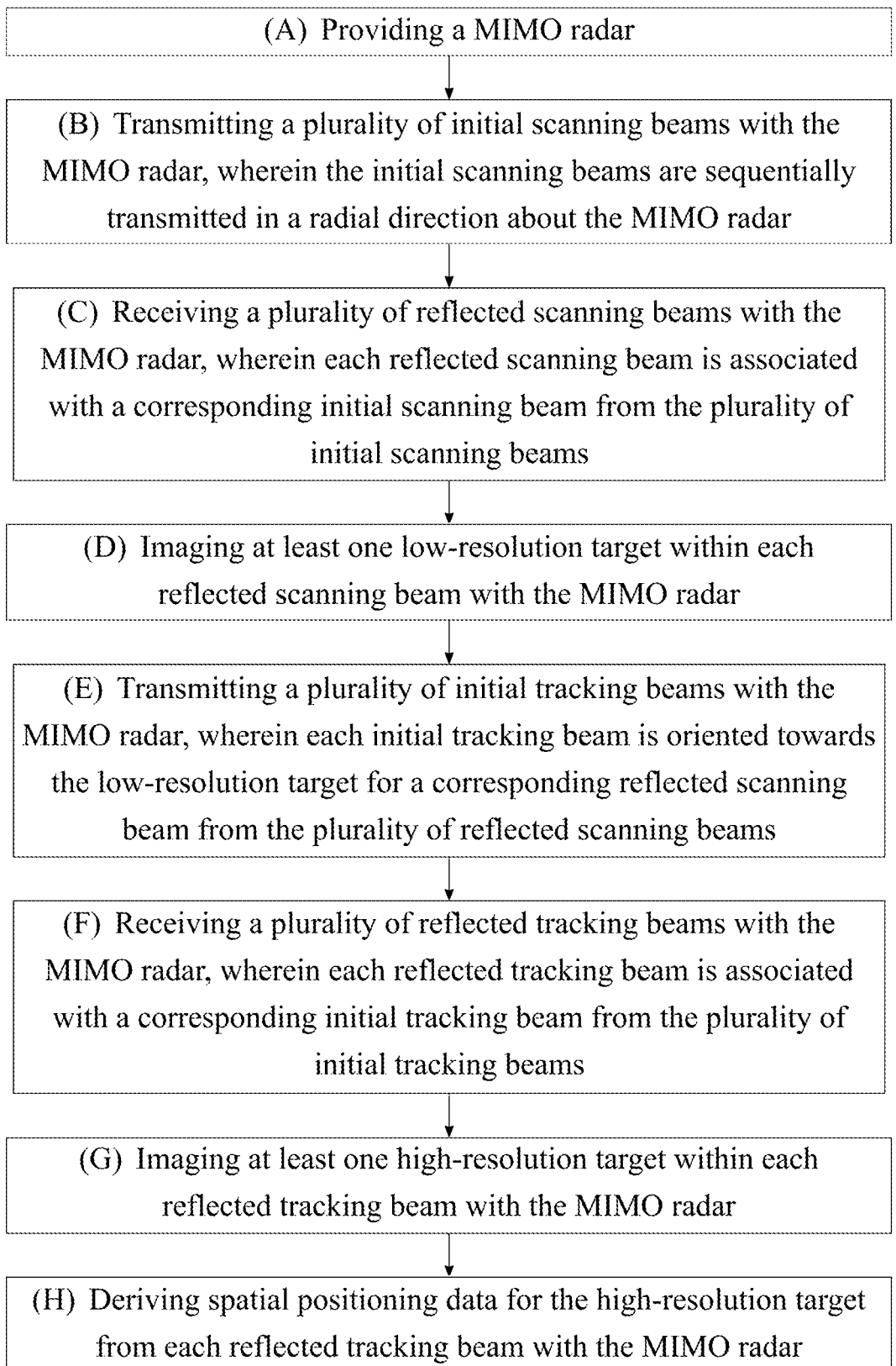
FIG. 2 is a flowchart of the overall process of the method of the present invention.
Figure 3:
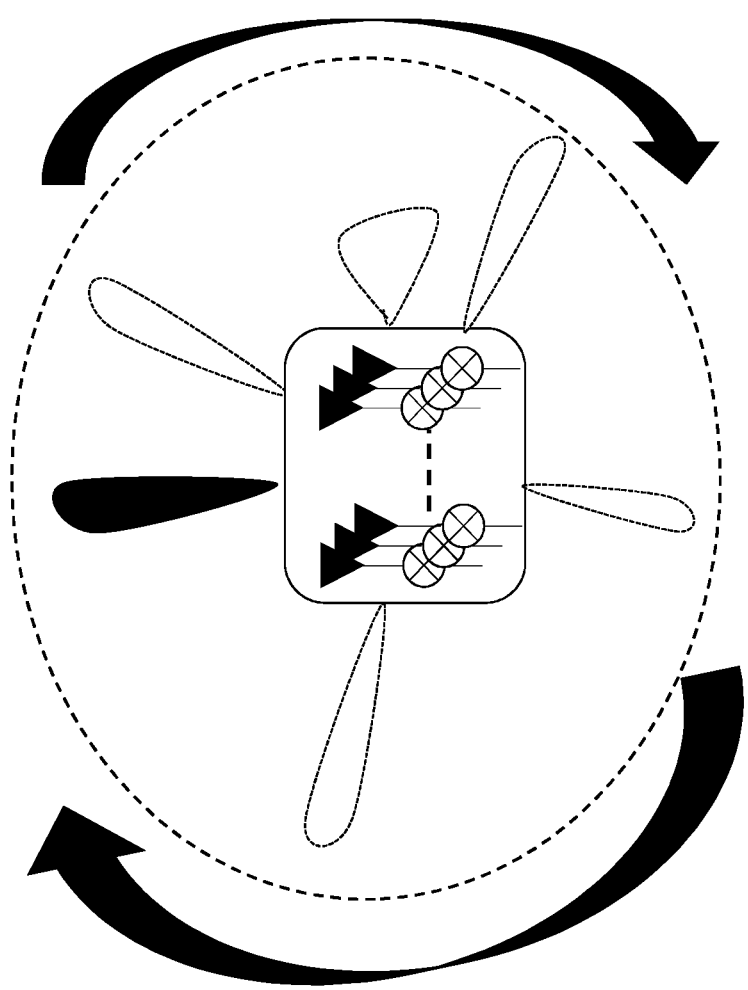
FIG. 3 is an illustration of the MIMO radar transmitting the plurality of scanning beams about 360-degree range.
Figure 4:
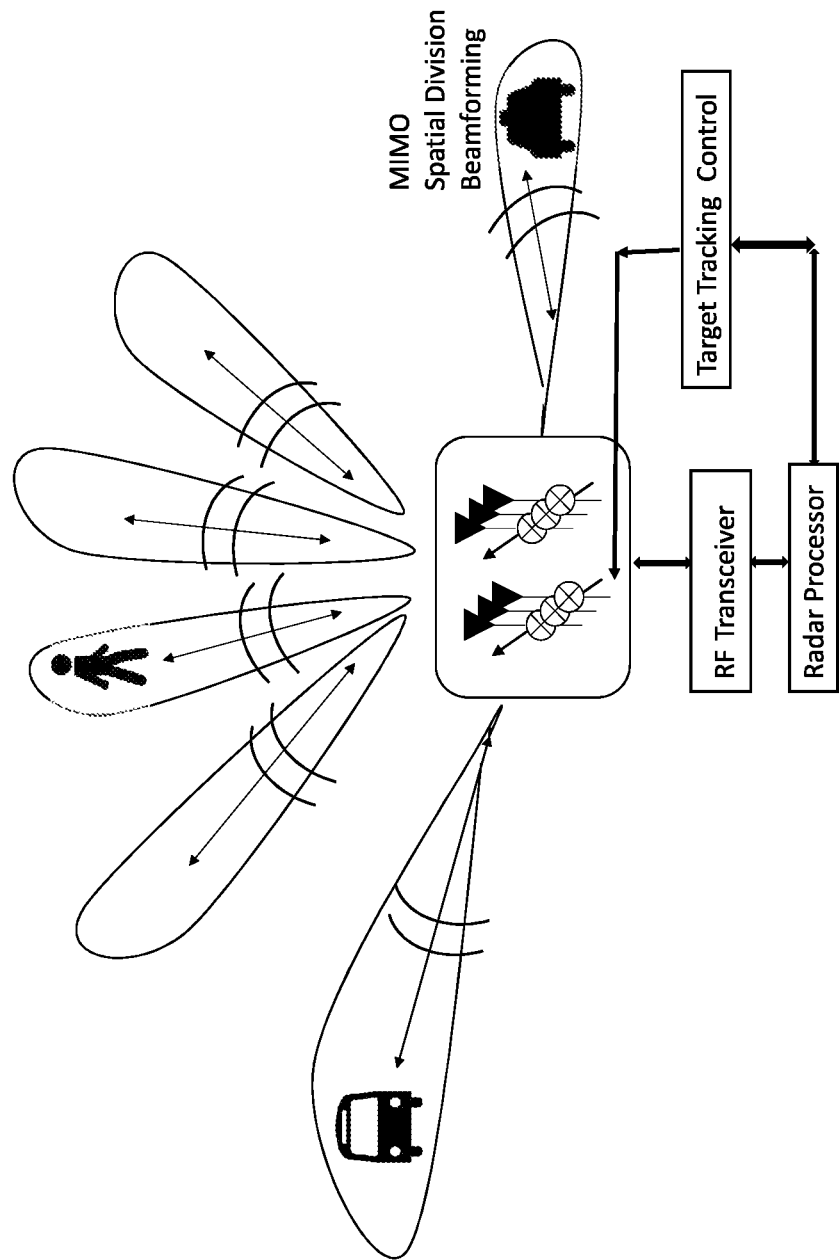
FIG. 4 is an illustration of the MIMO radar using spatial division for multi-target tracking.

As can be seen in FIG. 1 and FIG. 2, a MIMO radar is provided to transmit radar signals and receive echoes of the radar signals reflected by objects in the scan range and beam direction (Step A). In the preferred implementation, the MIMO radar is provided as part of a vehicle's advanced driver assistance system (ADAS) or autonomous driving systems. Further, the MIMO radar processes the echoes of the radar signals to determine the distance, speed, and direction of arrive estimates of objects surrounding the vehicle such as other vehicles, pedestrians, and/or buildings on the side of the road. Preferably, the radar signals are transmitted as beams that can be pointed towards the desired direction. As can be seen in FIG. 3, the MIMO radar transmits a plurality of initial scanning beams, wherein the initial scanning beams are sequentially transmitted in a radial direction about the MIMO radar (Step B). Each initial scanning beam is transmitted individually in a radial direction about the MIMO radar. This gives the MIMO radar 360-degree coverage about the vehicle. Accordingly, the MIMO radar receives a plurality of reflected scanning beams, wherein each reflected scanning beam is associated with a corresponding beam from the plurality of initial scanning beams (Step C). Steps B and C are hereby referred to as the overall process of the method. As can be seen in FIG. 4, the detection of a reflected scanning beam indicates a target in the direction of the initial scanning beam. Thus, if the vehicle is surrounded by multiple objects, a plurality of reflected scanning beams is generated by some of the initial scanning beams reflecting off those multiple objects. In selected embodiments of the present invention, the MIMO radar uses spatial filtering or time division to detect each initial scanning beam individually. In this case, the reflected scanning beam originates from the same direction as the initial scanning beam.

Accordingly, the MIMO radar images at least one low-resolution target within each reflected scanning beam (Step D). In the collinear case, where two objects are in the direction of a single initial scanning beam, the MIMO radar may detect more than one low-resolution target within the respective reflected scanning beam. In some embodiments of the present invention, the MIMO radar adaptively adjusts the signal characteristics of the plurality of initial scanning beams based on the signal characteristics of the corresponding reflected scanning beam. In one possible embodiment, the MIMO radar may adaptively adjust the duration of the plurality of the initial scanning beams based on detection of a corresponding reflected scanning beam. In another possible embodiment, the MIMO radar may adaptively adjust the shape of the plurality of initial scanning beams based on the distance of the corresponding low-resolution target. This allows for greater radar imaging resolution and better detection of the objects.

Subsequently, the MIMO radar devotes a tracking beam to track the position and the motion of the low-resolution tracking beam over time. Accordingly, the MIMO radar transmits a plurality of initial tracking beams, wherein each initial tracking beam is oriented towards the low-resolution target for a corresponding reflected scanning beam from the plurality of reflected scanning beams (Step E). As such, each low-resolution target identified in Step D is assigned an initial tracking beam with the MIMO radar. The initial tracking beam continues to track the low-resolution target as long as the low-resolution target remains in range. Subsequently, the MIMO radar receives a plurality of reflected tracking beams, wherein each reflected tracking beam is associated with a corresponding initial tracking beam from the plurality of initial tracking beams (Step F). Preferably, the initial reflected tracking beam is reflected with sufficient energy and intensity to generate a high-resolution radar image of the low-resolution target.

Figure 14:
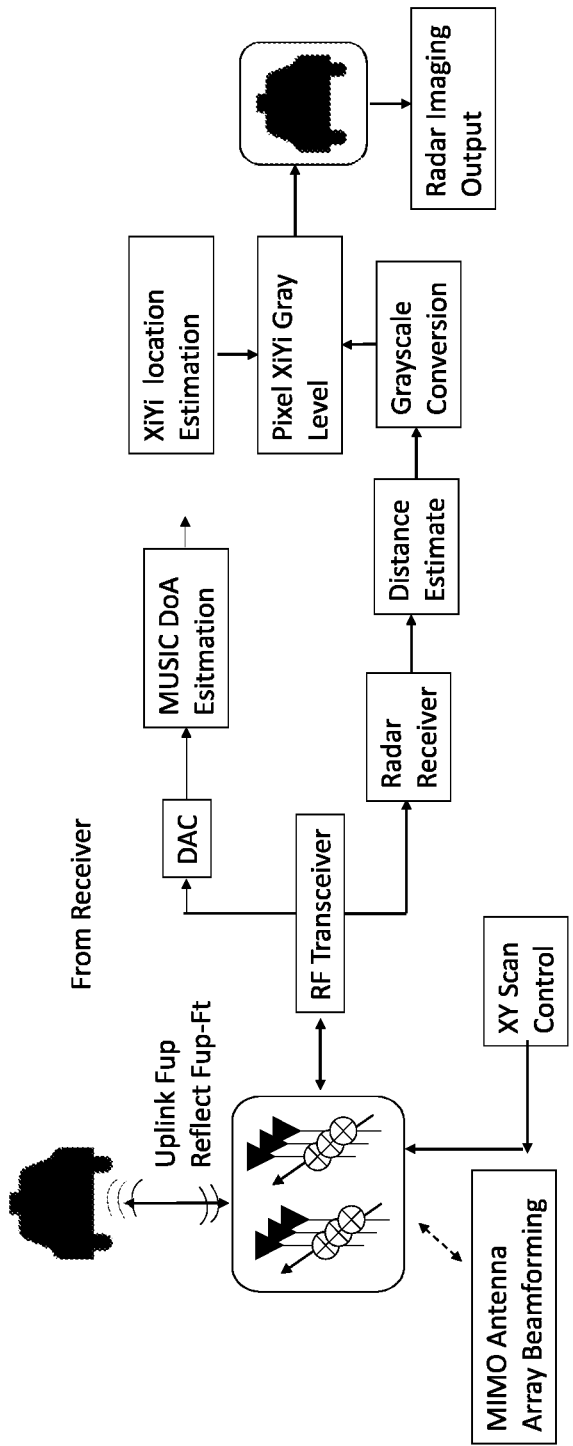
FIG. 14 is a schematic diagram of the MIMO radar configured for high-resolution radar imaging.

As can be seen in FIG. 14, accordingly, the MIMO radar images at least one high-resolution target within each reflected tracking beam (Step G). The increased energy of the reflected tracking beam allows the MIMO radar to image fine-grained details of the high-resolution target. This aids in the identification of the high-resolution target as a vehicle, pedestrian, road infrastructure, or the like. In one embodiment, the MIMO radar may employ artificial intelligence (AI) software to aid in identifying the high-resolution target. Further, the increased level of detail also further define an amorphous low-resolution target into several discrete high-resolution targets. Subsequently, the MIMO radar derives spatial positioning data for the high-resolution target from each reflected tracking beam (Step H). More specifically, since the high-resolution target has clearly defined boundaries, the MIMO radar can more accurately derive the accompanying spatial positioning data. The spatial positioning data may include, but may not be limited to, speed, position, direction-of-arrive estimates of the high-resolution target.

Figure 5:
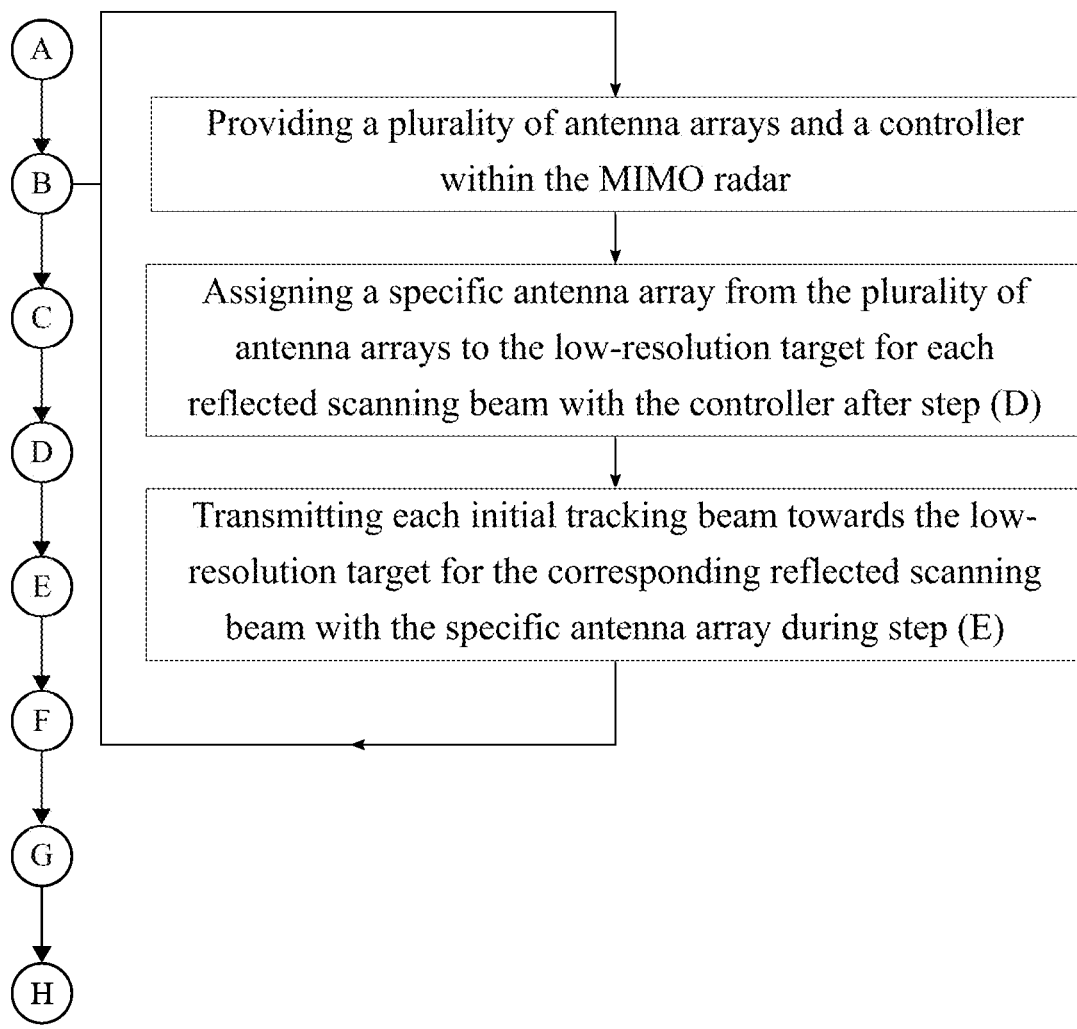
FIG. 5 is a flowchart of a subprocess for assigning a specific antenna array to the low-resolution target.
Figure 6:
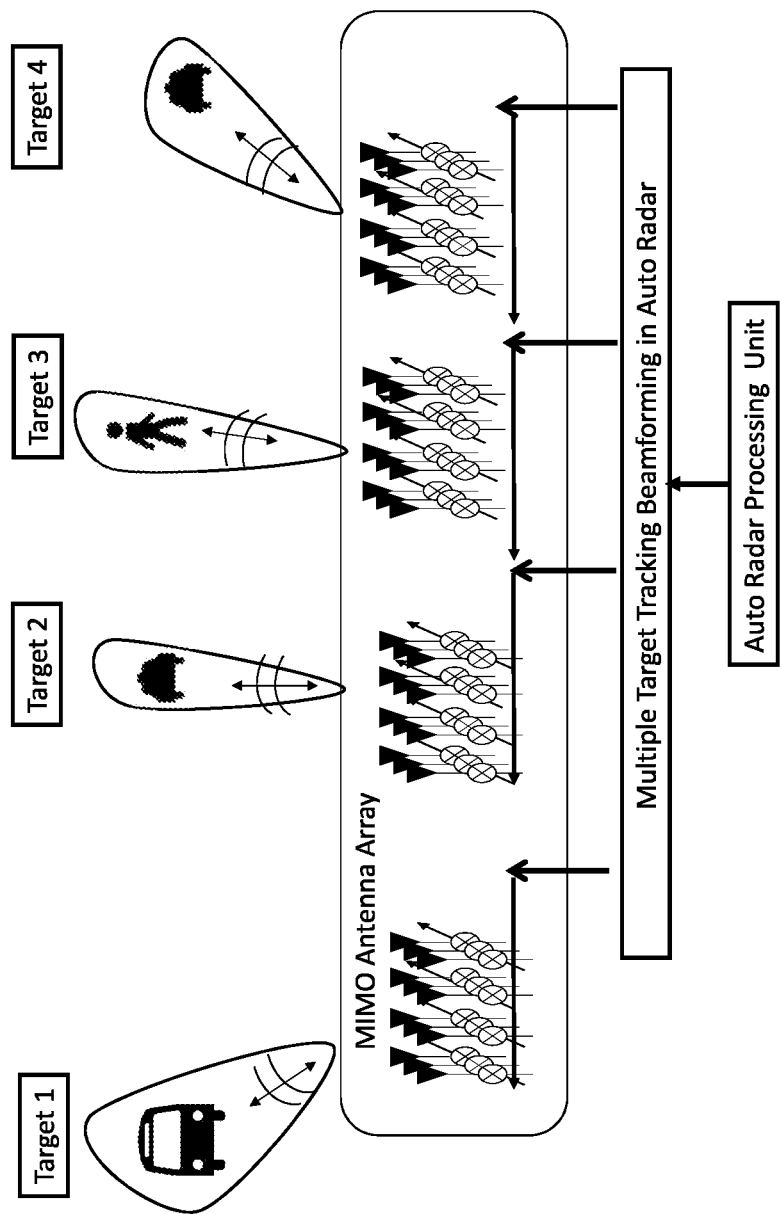
FIG. 6 is an illustration of the MIMO radar assigning each low-resolution target to a corresponding specific antenna array.

Referring to FIG. 5, a plurality of antenna arrays and a controller is provided within the MIMO radar. Each of the plurality of antenna arrays transmits a wave-front that is phase shifted to generate constructive interference in the direction of the wave-front and destructive interference in every other direction. This enables the generation of the plurality of initial scanning beams and the plurality of initial tracking beams. The controller comprises one or more signal processing microcontrollers for spatially filtering the plurality of reflected scanning beams and the plurality of reflected tracking beams. As can be seen in FIG. 6, once the low-resolution target is detected, the controller assigns a specific antenna array from the plurality of antenna arrays to the low-resolution target for each reflected scanning beam after Step D. The specific antenna array transmits a continuous tracking beam towards the low-resolution target in order to create a high-resolution radar image. Finally, the specific antenna array transmits each initial tracking beam towards the low-resolution target for the corresponding reflected scanning beam during Step E. Depending on the specific characteristics of the low-resolution target, the controller may change the signal characteristics of the initial tracking beam. For example, in one embodiment, the width of the initial tracking beam may be widened to accommodate a low-resolution target in close proximity to the MIMO radar.

Preferably, in addition to transmitting the tracking beam, the specific antenna array is also responsible for receiving the corresponding reflected tracking beam. This allows the specific antenna array to gather high-resolution signature of the low-resolution target and generate high-resolution radar imaging.

Figure 7:
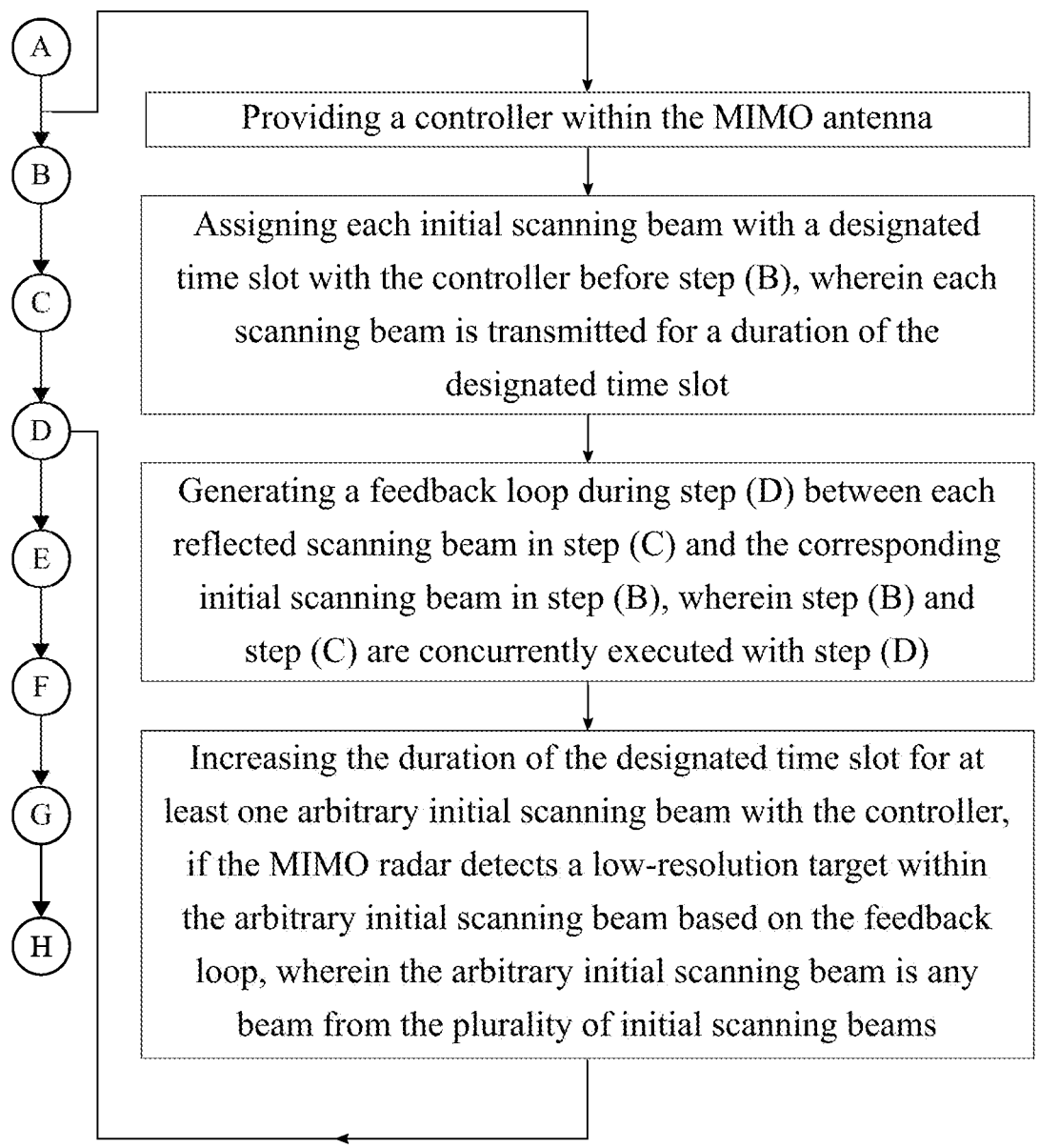
FIG. 7 is a flowchart of a subprocess for using a feedback loop to adjust the time slot for an arbitrary initial scanning beam.

Referring to FIG. 7, in the preferred embodiment, the plurality of initial scanning beams is transmitted in a scanning loop. Each scanning loop consists of the MIMO radar transmitting the plurality of initial scanning beams in a radial direction about the MIMO radar. The scanning loop may also be designated as the overall process of the present invention. Given the speed of the initial scanning beam, the corresponding reflected scanning beam is received almost simultaneously. The scanning loop concludes once the MIMO radar successfully transmits the initial scanning beam towards each direction in the scanning range. Thus, the scanning loop includes both the transmission and receiving phase of the plurality initial scanning beams. The MIMO radar uses the reflected scanning beam to optimize the initial scanning beam for increased observability and lower energy consumption. As such, the controller assigns each initial scanning beam with a designated time slot before step B, wherein each scanning beam is transmitted for a duration of the designated time slot. This allows the MIMO radar to increase the time slot at the direction where a target is detected. Accordingly, a feedback loop is generated during step D between each reflected scanning beam in step C and the corresponding initial scanning beam in step B, wherein step B and step C are concurrently executed with step D. Preferably, the feedback loop occurs as part of the scanning loop, thus the MIMO radar continues to transmit the plurality of initial scanning beams while simultaneously detecting the low-resolution target. As such, the MIMO radar continues to transmit the initial scanning beam while concurrently detecting at least one low-resolution target from the corresponding reflected scanning beam. In addition to detecting the low-resolution target, the feedback loop is also used to optimize the corresponding initial scanning beam in the subsequent scanning loop.

Figure 8:
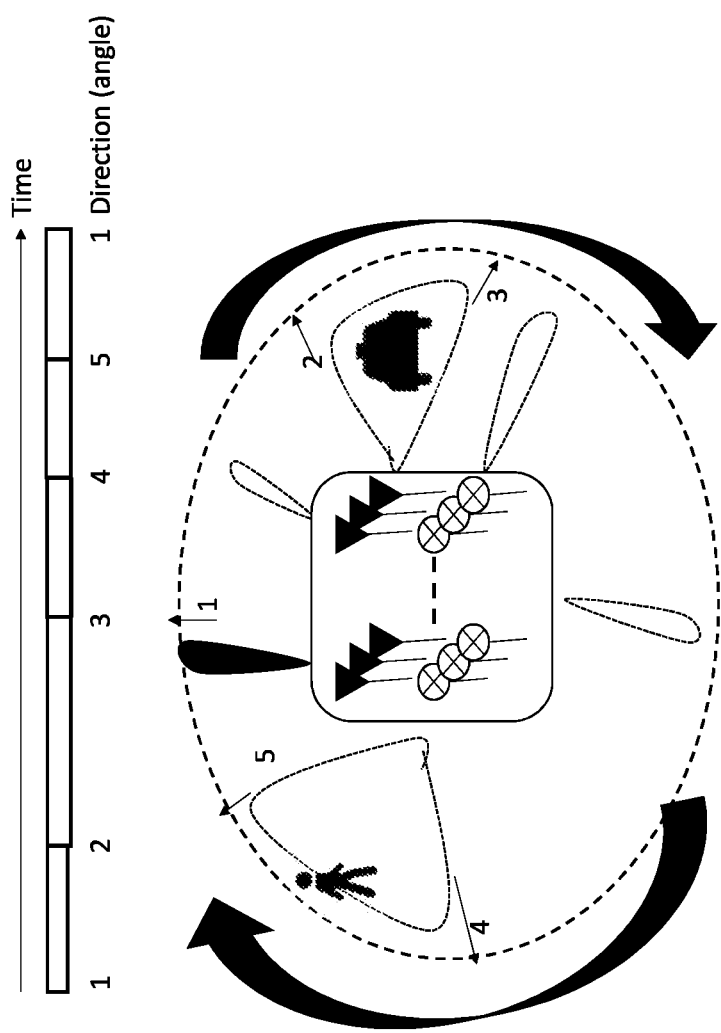
FIG. 8 is an illustration of the MIMO radar adjusting the time-delay for each scanning beam.

Referring to FIG. 8, in the preferred embodiment, the feedback loop is used to adjust the time slot of the plurality of initial scanning beams. As such, the controller increases the duration of the designated time slot for at least one arbitrary initial scanning beam, if the MIMO radar detects a low-resolution target within the arbitrary initial scanning beam based on the feedback loop, wherein the arbitrary initial scanning beam is any beam from the plurality of initial scanning beams. In particular, the MIMO radar uses the reflected scanning beam associated with the arbitrary initial scanning beam to detect the low-resolution target. Accordingly, if the low-resolution target is detected, the time slot for the arbitrary initial scanning beam is increased. This allows the MIMO radar to improve the imaging of the low-resolution target.

Figure 9:
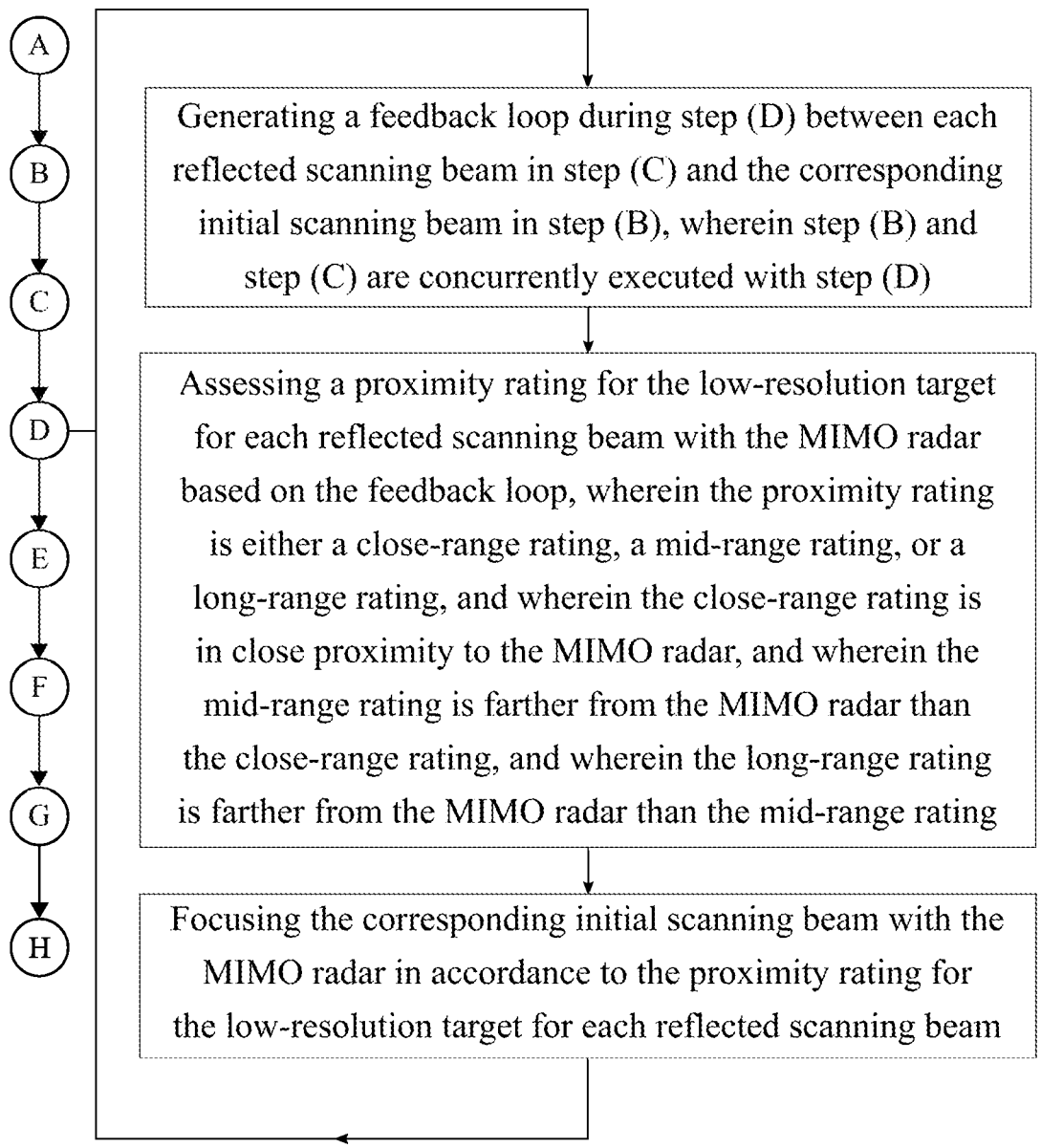
FIG. 9 is a flowchart of a subprocess for assessing a proximity rating for the low-resolution target for each reflected scanning beam.
Figure 10:
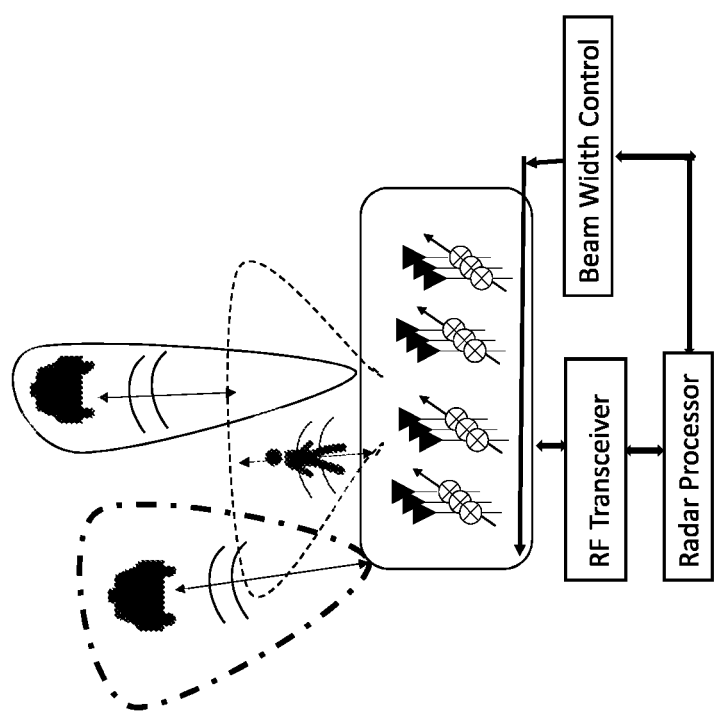
FIG. 10 is an illustration of the MIMO radar adjusting the beam-width of the plurality of scanning beams to increase radar range and optimal transmission power.

Referring to FIG. 9 and FIG. 10, in another embodiment, the feedback loop is used to change the shape of the initial scanning beam. For example, the initial scanning beam may be widened if the low-resolution target is close to the MIMO radar. Alternately, the initial scanning beam may be narrowed if the low-resolution target is in long-range distance from the MIMO radar. Accordingly, the MIMO radar assesses a proximity rating for the low-resolution target for each reflected scanning beam based on the feedback loop, wherein the proximity rating is either a close-range rating, a mid-range rating, or a long-range rating, and wherein the close-range rating is in close proximity to the MIMO radar, and wherein the mid-range rating is farther from the MIMO radar than the close-range rating, and wherein the long-range rating is farther from the MIMO radar than the mid-range rating. The proximity rating is based on the distance of the low-resolution target to the MIMO radar. In the preferred embodiment, the close-range rating, the mid-range rating, and the long-range rating each has an associated range of distance. As such, to be designated with the close-range rating, the mid-range rating, or the long-range rating, the distance between the low-resolution target and the MIMO radar must fall within the associated range of distance. Once the controller determines the correct proximity rating of the low-resolution target, the shape of the initial scanning beam is adjusted accordingly. As such, the MIMO radar focuses the corresponding initial scanning beam in accordance to the proximity rating for the low-resolution target for each reflected scanning beam. This involves changing the width of the corresponding initial scanning beam to best suit the proximity rating of the target.

Figure 11:
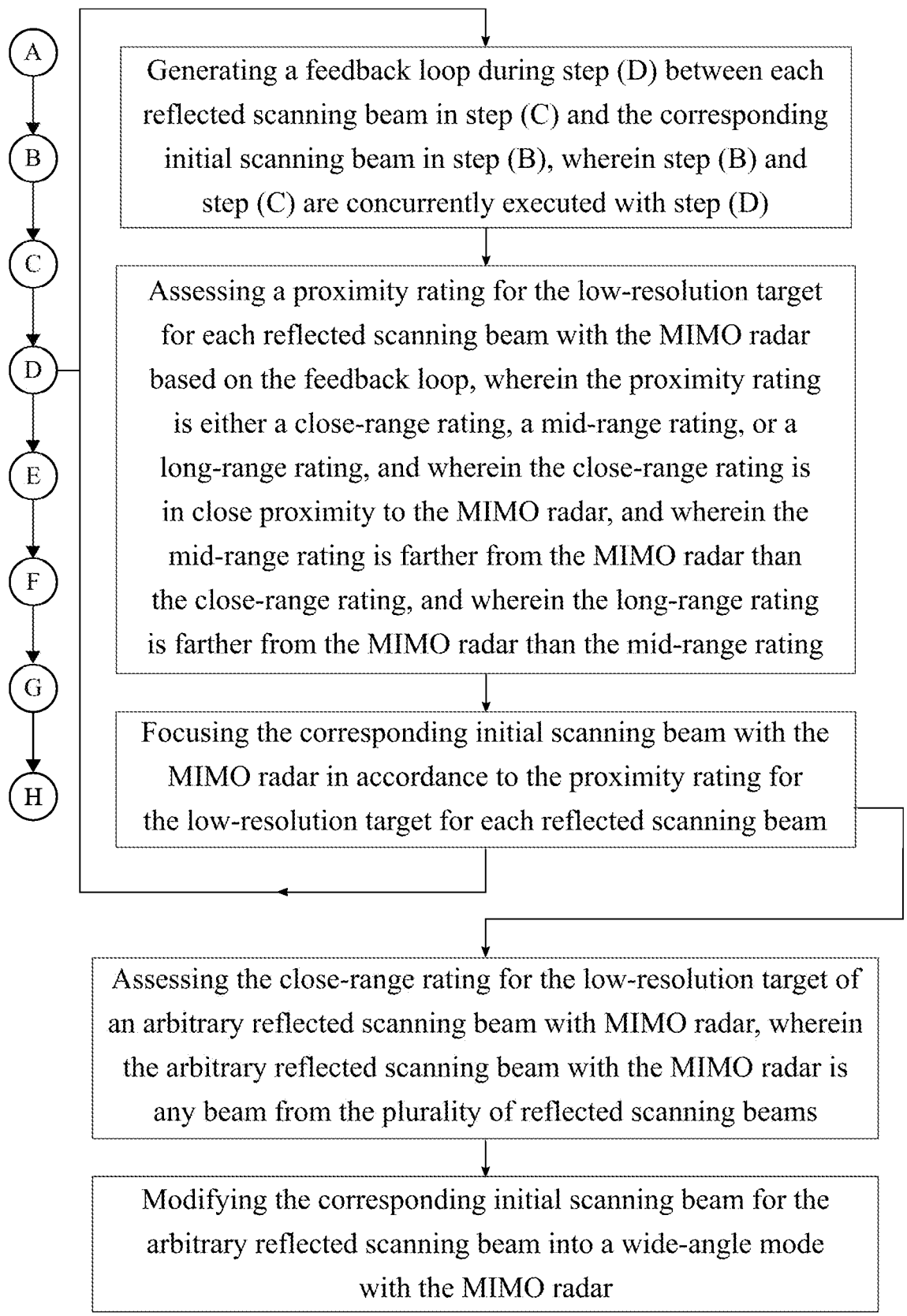
FIG. 11 is a flowchart of a subprocess for assessing a close-range rating for the low-resolution target and accordingly transmitting the initial scanning beam in a wide-angle mode.

Referring to FIG. 11, preferably, the controller is capable of adjusting the shape of the plurality of initial scanning beams depending on the feedback generated by the corresponding reflected scanning beam. As such, the MIMO radar assesses the close-range rating for the low-resolution target of an arbitrary reflected scanning beam, wherein the arbitrary reflected scanning beam is any beam from the plurality of reflected scanning beams. To do so, the controller checks if the distance between the low-resolution target and the MIMO radar falls within the range of distance for the close-range rating. Once confirmed, the MIMO radar modifies the corresponding initial scanning beam for the arbitrary reflected scanning beam into a wide-angle mode. Generally, if the low-resolution target is in close-range to the MIMO radar, the low-resolution target presents a larger radar cross section. Thus, the controller must increase the width of the initial scanning to ensure the low-resolution target is within the boundaries of the initial scanning beam. This allows the MIMO radar to more efficiently detect the low-resolution target.

Figure 12:
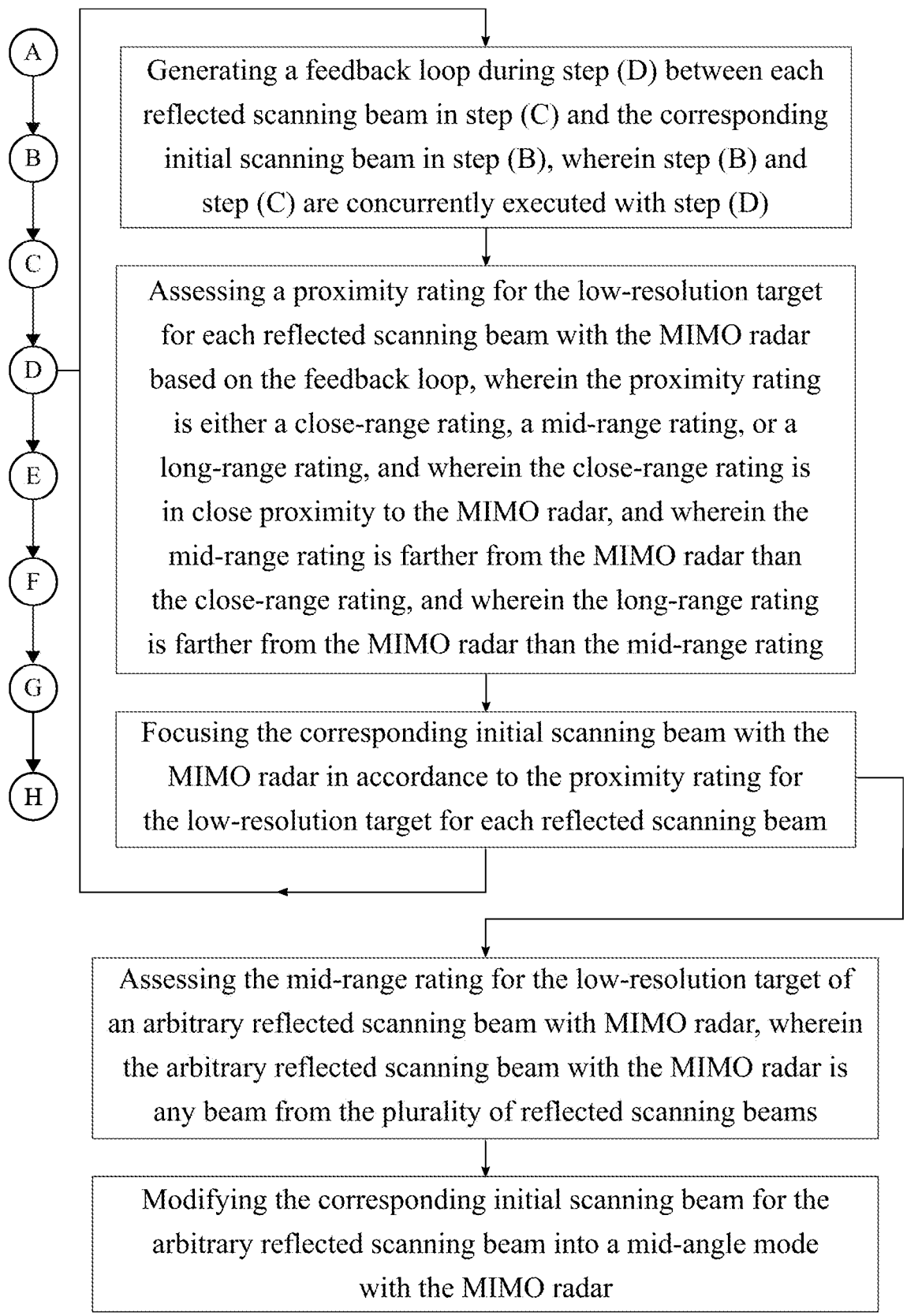
FIG. 12 is a flowchart of a subprocess for assessing a mid-range rating for the low-resolution target and accordingly transmitting the initial scanning beam in a mid-angle mode.

Referring to FIG. 12, alternately, if the low-resolution target has mid-range rating, the MIMO radar reduces the width of the initial scanning beams. Accordingly, the MIMO radar assesses the mid-range rating for the low-resolution target of an arbitrary reflected scanning beam, wherein the arbitrary reflected scanning beam with the MIMO radar is any beam from the plurality of reflected scanning beams. Subsequently, the MIMO radar modifies the corresponding initial scanning beam for the arbitrary reflected scanning beam into a mid-angle mode. The mid-angle mode reduces the width of the initial scanning beam. This is because the cross-section of the low-resolution target presented to the MIMO radar decreases, as the distance between the low-resolution target and the MIMO radar increases. As such, the controller must make the initial scanning beam narrower to preserve the information in the reflected scanning beam.

Figure 13:
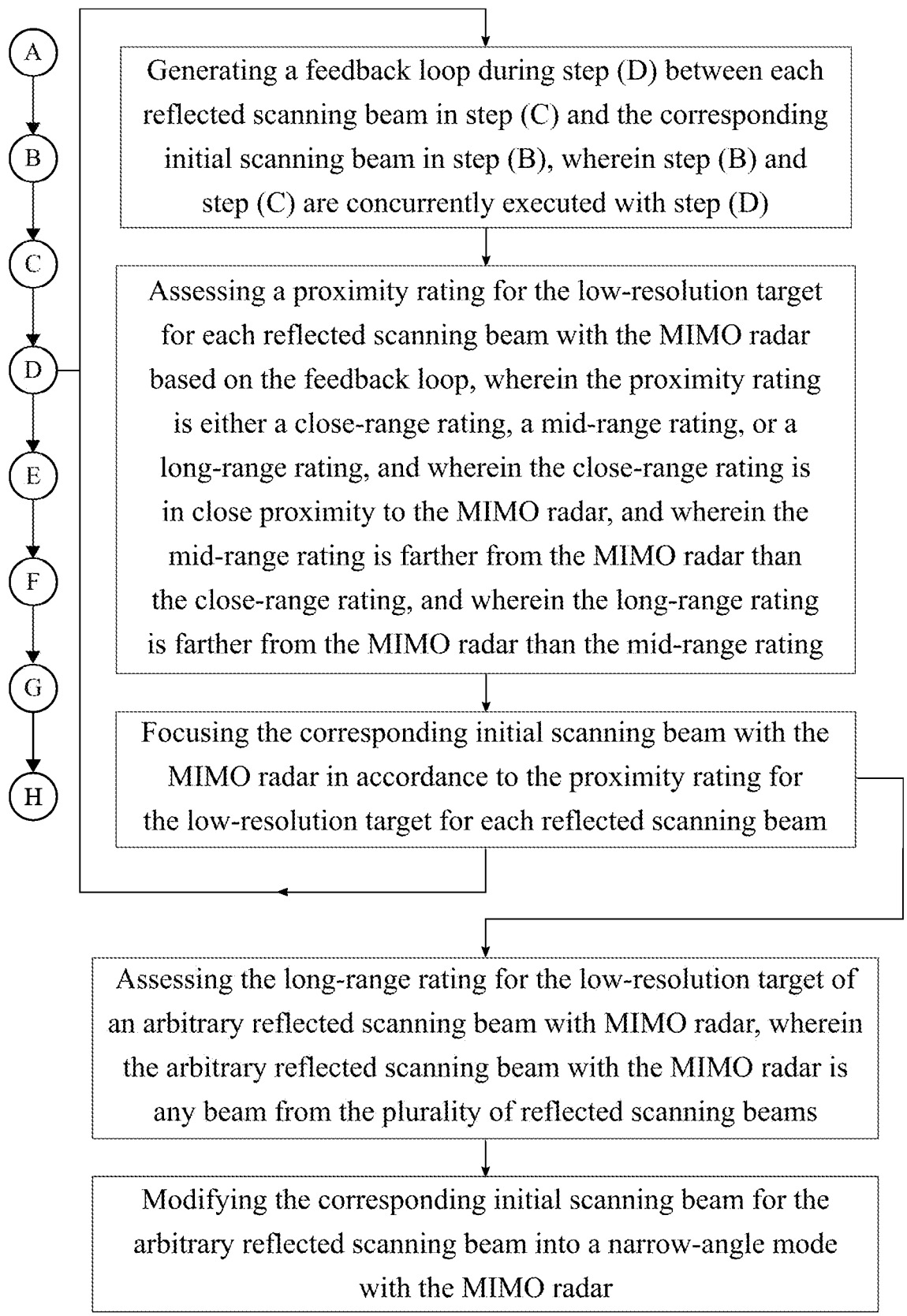
FIG. 13 is a flowchart of a subprocess for assessing a long-range rating for the low-resolution target and accordingly transmitting the initial scanning beam in a narrow-angle mode.

Referring to FIG. 13, in yet another embodiment, the controller may designate the low-resolution target with a long-range rating. Accordingly, the MIMO radar assesses the long-range rating for the low-resolution target of an arbitrary reflected scanning beam, wherein the arbitrary reflected scanning beam with the MIMO radar is any beam from the plurality of reflected scanning beams. Subsequently, the MIMO radar modifies the corresponding initial scanning beam for the arbitrary reflected scanning beam into a narrow-angle mode with the MIMO radar. In narrow-angle mode, the initial scanning beam is concentrated into a narrow beam which can be aimed at an object far from the MIMO radar. As such, the narrow-angle mode is suited to detect a low-resolution target in long range to the MIMO radar with a reduced radar cross-section.

Although the invention has been explained in relation to its preferred embodiment, it is to be understood that many other possible modifications and variations can be made without departing from the spirit and scope of the invention as hereinafter claimed.

What is claimed is:

1. A method of adaptative-array beamforming with a multi-input multi-output (MIMO) automobile radar, the method comprises the steps of:
   (A) providing a MIMO radar;
   (B) transmitting a plurality of initial scanning beams with the MIMO radar, wherein the initial scanning beams are sequentially transmitted in a radial direction about the MIMO radar;
   (C) receiving a plurality of reflected scanning beams with the MIMO radar, wherein each reflected scanning beam is associated with a corresponding initial scanning beam from the plurality of initial scanning beams;
   (D) imaging at least one low-resolution target within each reflected scanning beam with the MIMO radar;
   (E) transmitting a plurality of initial tracking beams with the MIMO radar, wherein each initial tracking beam is oriented towards the low-resolution target for a corresponding reflected scanning beam from the plurality of reflected scanning beams;
   (F) receiving a plurality of reflected tracking beams with the MIMO radar, wherein each reflected tracking beam is associated with a corresponding initial tracking beam from the plurality of initial tracking beams;
   (G) imaging at least one high-resolution target within each reflected tracking beam with the MIMO radar; and
   (H) deriving spatial positioning data for the high-resolution target from each reflected tracking beam with the MIMO radar.

2. The method of adaptative-array beamforming with a multi-input multi-output (MIMO) automobile radar, the method as claimed in claim 1 comprises:
   providing a plurality of antenna arrays and a controller within the MIMO radar;
   assigning a specific antenna array from the plurality of antenna arrays to the low-resolution target for each reflected scanning beam with the controller after step (D); and
   transmitting each initial tracking beam towards the low-resolution target for the corresponding reflected scanning beam with the specific antenna array during step (E).

3. The method of adaptative-array beamforming with a multi-input multi-output (MIMO) automobile radar, the method as claimed in claim 1 comprises:
   providing a controller within the MIMO antenna;
   assigning each initial scanning beam with a designated time slot with the controller before step (B), wherein each scanning beam is transmitted for a duration of the designated time slot;
   generating a feedback loop during step (D) between each reflected scanning beam in step (C) and the corresponding initial scanning beam in step (B); and
   increasing the duration of the designated time slot for at least one arbitrary initial scanning beam with the controller, if the MIMO radar detects a low-resolution target within the arbitrary initial scanning beam based on the feedback loop, wherein the arbitrary initial scanning beam is any beam from the plurality of initial scanning beams.

4. The method of adaptative-array beamforming with a multi-input multi-output (MIMO) automobile radar, the method as claimed in claim 1 comprises:
   generating a feedback loop during step (D) between each reflected scanning beam in step (C) and the corresponding initial scanning beam in step (B);
   assessing a proximity rating for the low-resolution target for each reflected scanning beam with the MIMO radar based on the feedback loop, wherein the proximity rating is either a close-range rating, a mid-range rating, or a long-range rating, and wherein the close-range rating is in close proximity to the MIMO radar, and wherein the mid-range rating is farther from the MIMO radar than the close-range rating, and wherein the long-range rating is farther from the MIMO radar than the mid-range rating; and
   focusing the corresponding initial scanning beam with the MIMO radar in accordance to the proximity rating for the low-resolution target for each reflected scanning beam.

5. The method of adaptative-array beamforming with a multi-input multi-output (MIMO) automobile radar, the method as claimed in claim 4 comprises:
   assessing the close-range rating for the low-resolution target of an arbitrary reflected scanning beam with MIMO radar, wherein the arbitrary reflected scanning beam with the MIMO radar is any beam from the plurality of reflected scanning beams; and
   modifying the corresponding initial scanning beam for the arbitrary reflected scanning beam into a wide-angle mode with the MIMO radar.

6. The method of adaptative-array beamforming with a multi-input multi-output (MIMO) automobile radar, the method as claimed in claim 4 comprises:
   assessing the mid-range rating for the low-resolution target of an arbitrary reflected scanning beam with MIMO radar, wherein the arbitrary reflected scanning beam with the MIMO radar is any beam from the plurality of reflected scanning beams; and
   modifying the corresponding initial scanning beam for the arbitrary reflected scanning beam into a mid-angle mode with the MIMO radar.

7. The method of adaptative-array beamforming with a multi-input multi-output (MIMO) automobile radar, the method as claimed in claim 4 comprises:
   assessing the long-range rating for the low-resolution target of an arbitrary reflected scanning beam with MIMO radar, wherein the arbitrary reflected scanning beam with the MIMO radar is any beam from the plurality of reflected scanning beams; and
   modifying the corresponding initial scanning beam for the arbitrary reflected scanning beam into a narrow-angle mode with the MIMO radar.

* * * * *